(12) United States Patent
Yik

(10) Patent No.: US 6,816,677 B2
(45) Date of Patent: Nov. 9, 2004

(54) FILM COUNTER WHEEL AND METHOD FOR PRESETTING THE FILM COUNTER WHEEL DURING FILM PRE-LOADING

(75) Inventor: Kai Chung Franco Yik, Yuen Long (CN)

(73) Assignee: Concord Camera Corp., Hollywood, FL (US)

( * ) Notice: Subject to any disclaimer, the term of this patent is extended or adjusted under 35 U.S.C. 154(b) by 0 days.

(21) Appl. No.: 10/634,070

(22) Filed: Aug. 4, 2003

(65) Prior Publication Data

US 2004/0028402 A1 Feb. 12, 2004

Related U.S. Application Data

(60) Provisional application No. 60/400,917, filed on Aug. 2, 2002.

(51) Int. Cl.[7] .......................... G03B 17/02; G03B 1/66; G03B 17/36

(52) U.S. Cl. ............................. 396/284; 396/6; 396/535

(58) Field of Search ............................ 396/6, 387, 411, 396/535, 538, 281, 284, 395, 396, 399

(56) References Cited

U.S. PATENT DOCUMENTS

| 5,235,366 | A  | * | 8/1993 | Kucmerowski | ............. 396/387 |
| 5,713,046 | A  | * | 1/1998 | Kameyama et al. | ........... 396/6 |
| 5,754,892 | A  | * | 5/1998 | Yuito et al. | ..................... 396/6 |
| 6,226,457 | B1 |   | 5/2001 | Boyd et al. | |
| 6,233,400 | B1 | * | 5/2001 | Muramatsu et al. | ........... 396/6 |
| 6,343,185 | B1 | * | 1/2002 | Aoshima et al. | ............... 396/6 |

* cited by examiner

Primary Examiner—Alan Mathews
Assistant Examiner—Rochelle Blackman
(74) Attorney, Agent, or Firm—Scott L. Lampert; Kerry Sisselman

(57) ABSTRACT

A system and method for pre-setting the counter wheel orientation in a camera pre-loaded with film is provided. Alignment indicia on the counter wheel are arranged during assembly to determine at various positions relative to the camera metering system whether the counter silk screen has been properly aligned and the counter properly preset.

20 Claims, 10 Drawing Sheets

FILM COUNTER WHEEL AND METHOD FOR PRESETTING THE FILM COUNTER WHEEL DURING FILM PRE-LOADING

PRIORITY

The present application claims priority from co-pending provisional patent application Ser. No. 60/400,917, filed on Aug. 2, 2002 and entitled FILM COUNTER WHEEL AND METHOD FOR PRESETTING THE FILM COUNTER WHEEL DURING FILM PRE-LOADING.

FIELD OF THE INVENTION

The present invention relates to the field of cameras and, more particularly, to a system and method for pre-setting the counter wheel in a camera pre-loaded with film.

BACKGROUND OF THE INVENTION

Inexpensive cameras, such as single use cameras, have been provided which are pre-loaded with film in the factory and provided to the consumer ready for use. The film counter has usually been set to count down from the maximum number of exposures available on the camera back to zero. In this way, a consumer merely needs to look through the film counter window to determine how many pictures remain, without having to do the math or remember how many exposures were available initially on the roll.

However, it is difficult to set the counter wheel to the appropriate position during film pre-loading if the pre-loading is accomplished after the camera is assembled. The numbers silkscreened on the counter wheel must show the appropriate number of exposures remaining after the film has been pre-wound.

What is needed is a simple but accurate system and method for pre-setting the film counter wheel when pre-loading film into a camera. This object, as well as others, is satisfied by the present inventions.

SUMMARY OF THE INVENTION

A system and method for pre-setting the counter wheel orientation in a camera pre-loaded with film is provided. Alignment indicia on the counter wheel are arranged during assembly to determine at various positions relative to the camera metering system whether the counter silk screen has been properly aligned and the counter properly preset.

Other objects and advantages of the present invention will become more readily apparent in the description that follows.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an exemplary embodiment that is presently preferred, it being understood however, that the invention is not limited to the specific methods and instrumentality's disclosed. Additionally, like reference numerals represent like items throughout the drawings. In the drawings.

DETAILED DESCRIPTION OF THE PREFERRED EMBODIMENTS

Before explaining the disclosed embodiments of the present invention in detail, it is to be understood that the invention is not limited in its application to the details of the particular arrangement shown since the invention is capable of other embodiments. Also, the terminology used herein is for the purpose of description and not of limitation.

Certain cameras, such as single use cameras, are pre-loaded with film in the factory and provided to the consumer ready for use. Traditionally, pre-loaded cameras include a film counter wherein the film counter wheel has a printed set of numbers showing the number of available exposures remaining in the camera. A counter wheel and method are provided to permit the film counter wheel to be preset to a specific location during film pre-loading. The counter wheel is formed with at least one hole therethrough to provide for alignment of the counter wheel as necessary to align the counter wheel for film preloading and ensure proper alignment of the silk screening.

Figure 1:
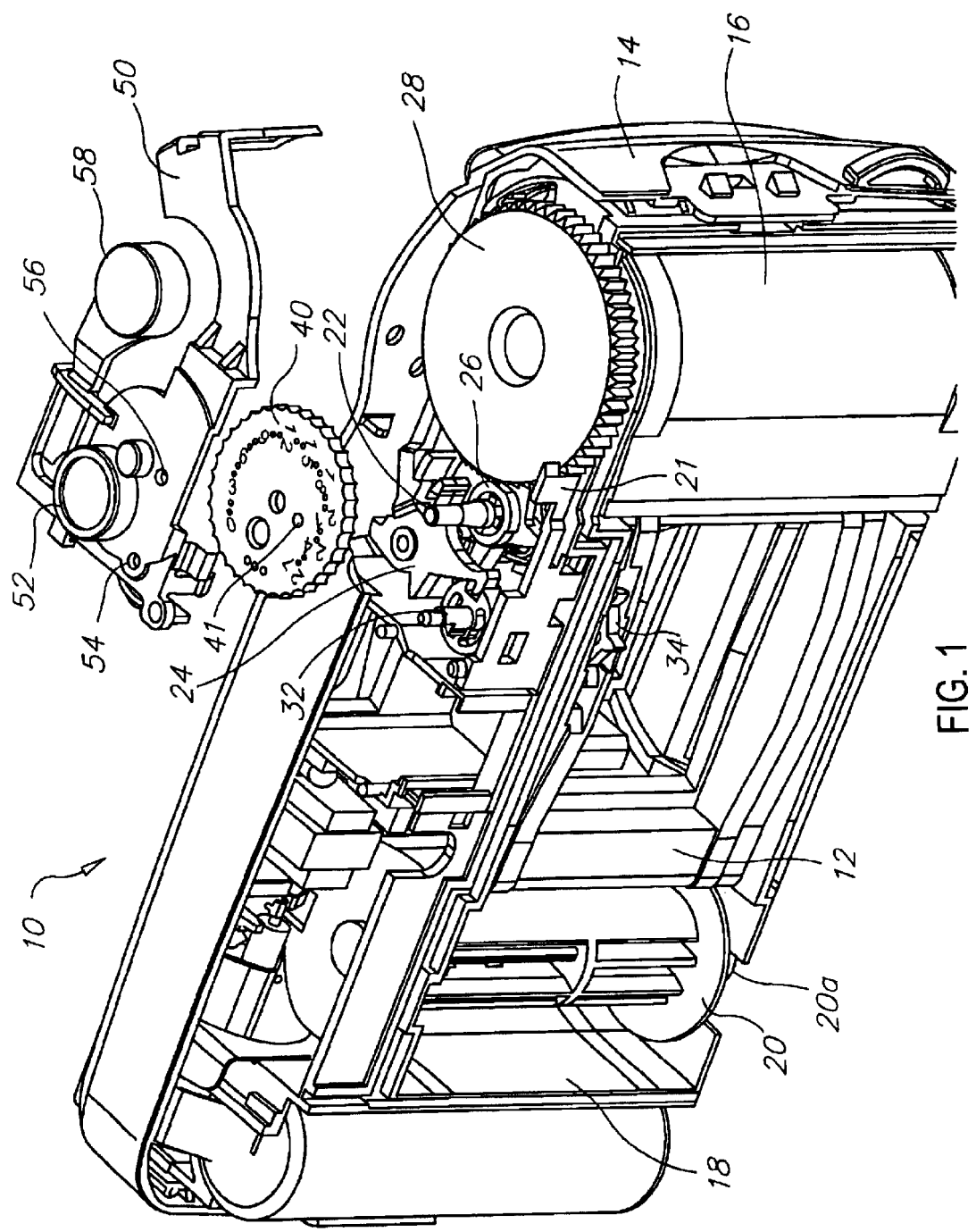
FIG. 1 is a rear perspective view of a camera having various parts removed and other parts exploded to more clearly show certain subsystems of the camera.
Figure 2:
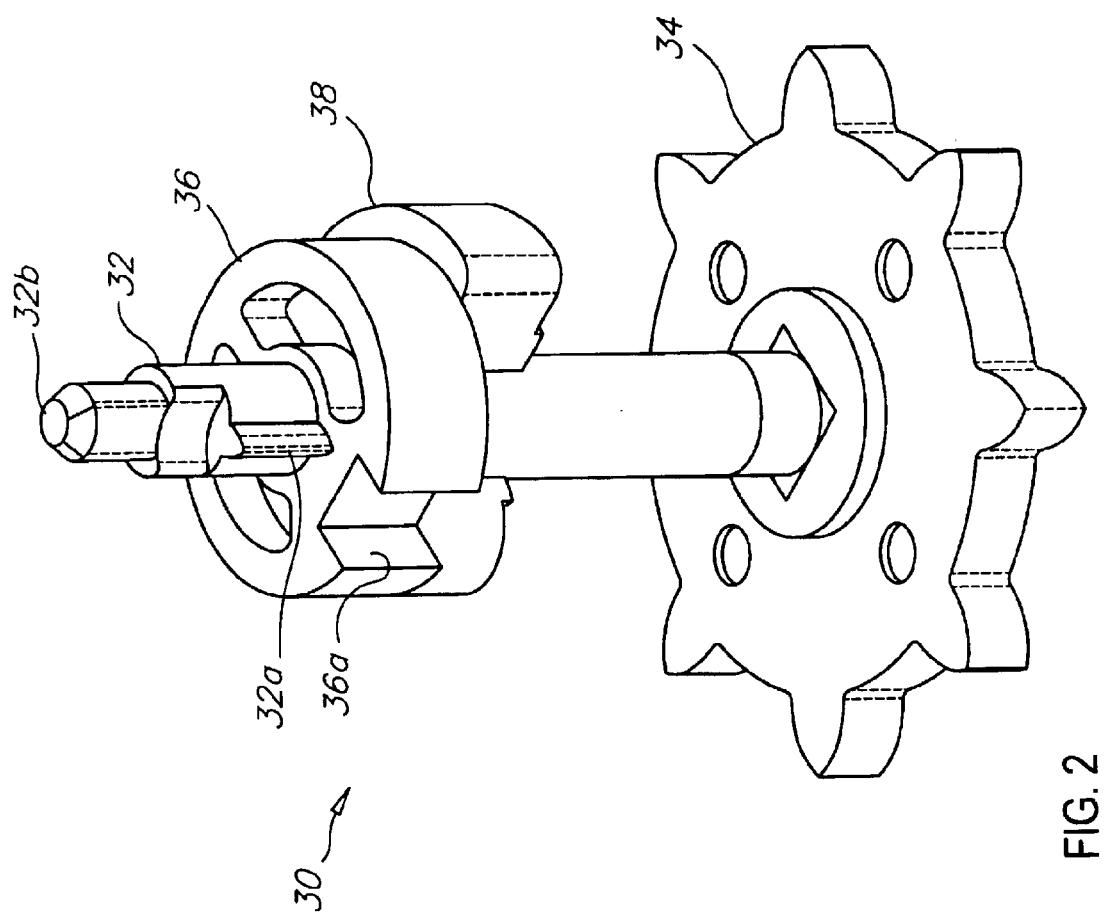
FIG. 2 is an enlarged perspective view of the sprocket assembly of the camera of FIG. 1.

Referring now to FIGS. 1–9B, there is shown a camera in accordance with the present invention. Referring more particularly to FIG. 1, there is shown a rear perspective view of a camera 10 including an exploded portion and having parts removed to more clearly show features of the film advance/metering, anti-reversal and exposure subsystems. Camera 10 includes a main body portion 12 located between a front cover 14 and a rear cover (not shown). Main body portion 12 is molded to contain a film cassette receiving chamber in which is placed a film cassette 16 and a take-up spool chamber 18. The take-up spool chamber 18 is designed to receive a spool 20 therein. The bottom portion of the spool 20 includes a socket 20a designed to extend through the outer covers and engage a rotatable tool for pre-winding the film. One such film pre-winding method is described in U.S. Pat. No. 6,226,457, that patent being incorporated herein.

Mounted on or integral with the body 12 are portions of the film transport and metering system, as well as the anti-reversal pawl 21. Anti-reversal pawl 21 is designed to engage the teeth on the advance wheel 28 to permit winding in only the film advance direction. Attempting to wind the film in the pre-wind direction will cause the pawl end of the anti-reversal pawl 21 to lodge between adjacent teeth of the advance wheel 28 preventing movement of the advance wheel in that direction.

A film advance/metering subsystem is mounted on the main body 12 and includes the film advance wheel 28, a striker 26 mounted on the body 12 via post 22, a release claw 24, the sprocket assembly 30, the counter wheel 40 and top plate 50. Sprocket assembly 30 includes a sprocket 34, which extends into the film path through the main body 12 in order to engage the film. As shown more specifically in FIG. 2, the sprocket 34 is attached to a sprocket shaft 32. In one embodiment the sprocket shaft 32 connects to the sprocket 34 at a square hole formed in the sprocket 34. Additionally fixed to the sprocket shaft 32 are the primary cam 36 including a notch 36a and a secondary cam 38. The sprocket assembly 30 is positioned so that when engaged, a finger on the striker 26 follows the outer surface of the secondary cam 38 to rotate the striker 26 back to the charged position, while a follower finger 24a follows the outer surface of the cam 36 during film advance. The cams 36, 38 are secured to the shaft 32 and rotate with the sprocket 34, one revolution for each film frame. Sprocket shaft 32 additionally includes a single tooth 32a and a pin portion 32b as will be described more fully herebelow.

Striker 26 and the release claw 24 are both spring biased into their normal positions by torsion springs, not shown. The striker 26 includes a tab 26a and a cam follower finger 26b. Release claw 24 includes, among other features, a follower finger 24a, shoulder 24b, spur portion 24c, trigger plate 24d and pawl 24e. The release claw 24 is normally spring biased such that follower finger 24a follows the outer surface of the cam 36 after a film frame exposure is wound into the film cassette 16. When the camera is readied for the next exposure, the follower finger 24a is forced all the way into the notch 36a, the striker tab 26a rests against the release claw shoulder 24b and the pawl end 24e of the release claw 23 is lodged between adjacent teeth of the advance wheel, preventing the advance wheel from further movement. A leg (not shown) on the top plate 50 contacts the trigger plate 24d when the trigger button 50 is depressed, releasing the release claw and permitting the striker to return to its normal condition, thus momentarily opening the shutter as it passes.

The counter wheel 40 sits on the post 22 that centers the striker 26. Additionally, the counter wheel is held in place by the top plate 50. Top plate 50 is matingly engaged with the main body 12 of the camera 10. A hole 54 in the top plate engages the pin end 32b of the sprocket shaft 32. The number of frames remaining indicated on the counter wheel can be viewed through the counter window 52 formed in the top plate 40. When assembled, window 52 extends through an aperture in the front and rear covers of the camera 10. Alignment holes 41 and 56 pass through the counter wheel and top plate, respectively. Additionally, in one preferred embodiment, the counter wheel 40 additionally includes at least a second alignment indicia indicated by the holes 43a, 43b and 43c. If desired, additional alignment indicia, such as alignment arrow 44, may be provided to assist in setting the counter.

On the back side of the counter wheel 40, a wedge shaped protrusion 47 extends from the central hole 45, opposite the alignment hole 41. Numbered indicia, such as indicia 48, are silk-screened on the counter wheel. Teeth, such as tooth 49 are evenly spaced on the outer perimeter of the counter wheel 40.

Figure 3:
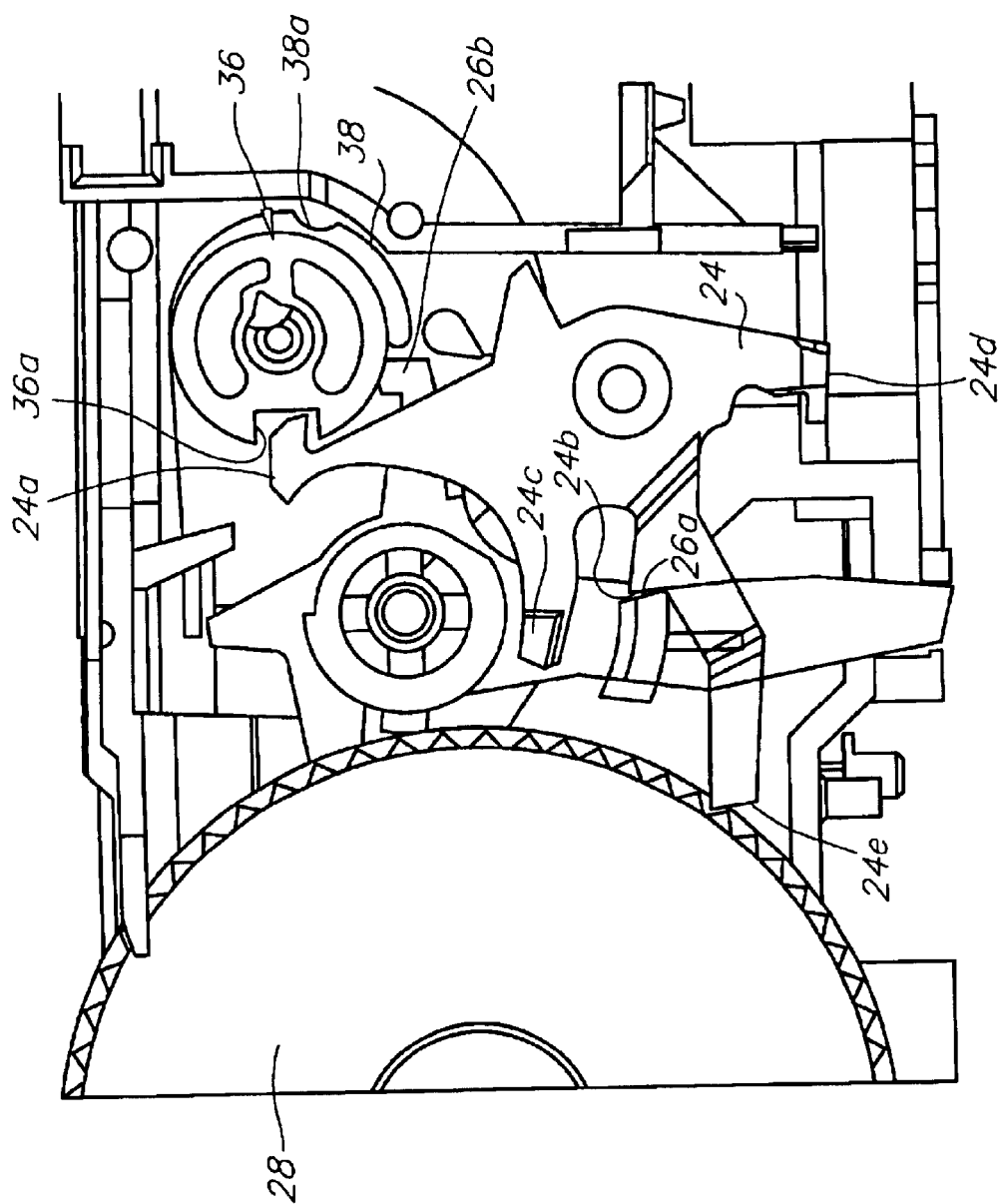
FIG. 3, is a top plan view of the certain film advance/metering subsystem components of the camera as found in the camera of FIG. 1.
Figure 4:
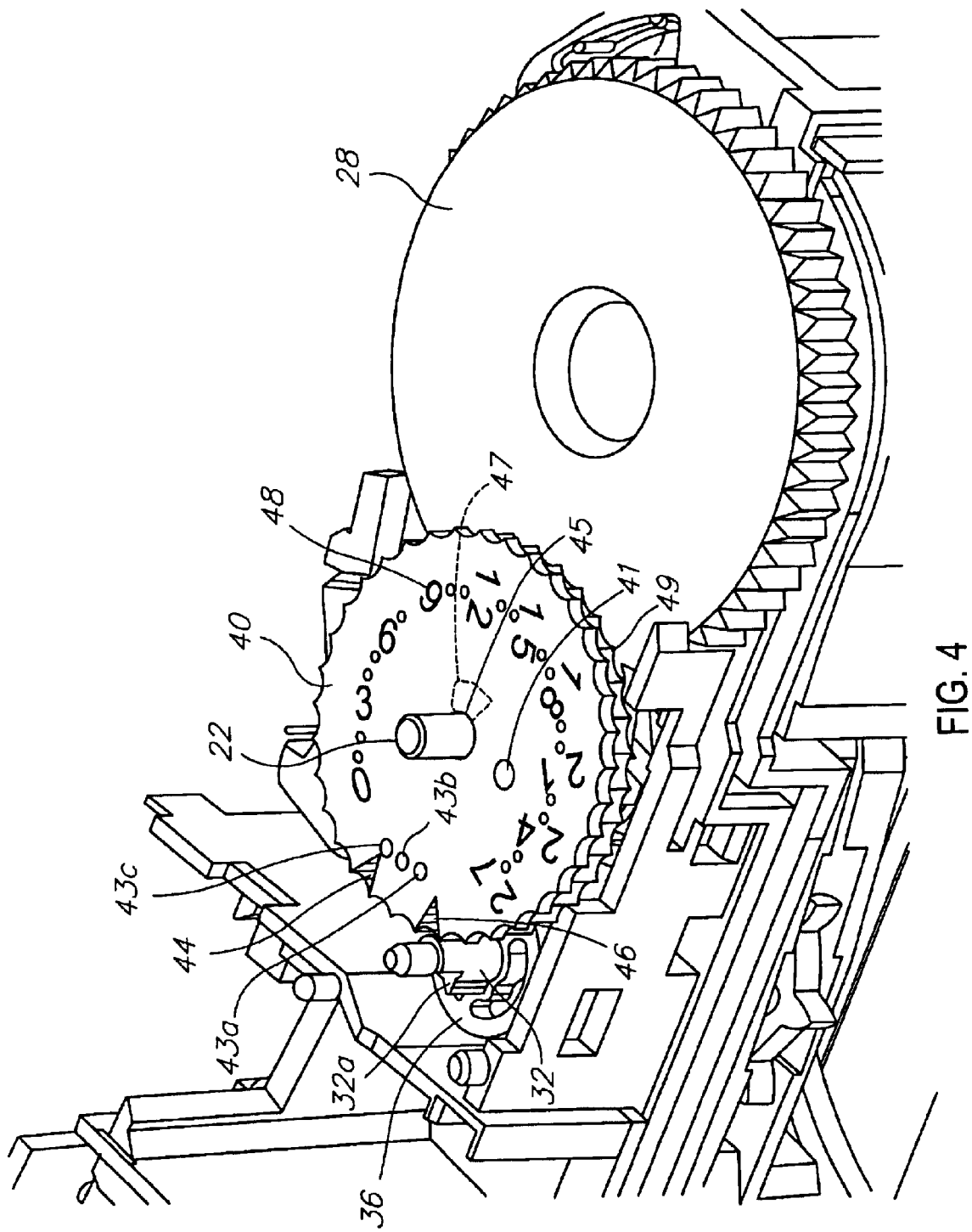
FIG. 4 is a partial perspective view of a the internal counter subsystem of a camera in accordance with one embodiment of the present invention.

A method of setting the counter wheel 40 will now be described. Initially, with both covers removed from the camera, the sprocket shaft should be locked by the release claw, as shown in FIG. 3. When locked, the follower finger 24a rests in the notch 36a and the release claw shoulder 24b abuts the striker tab 26a, additionally placing the striker in the loaded position.

Figure 5:
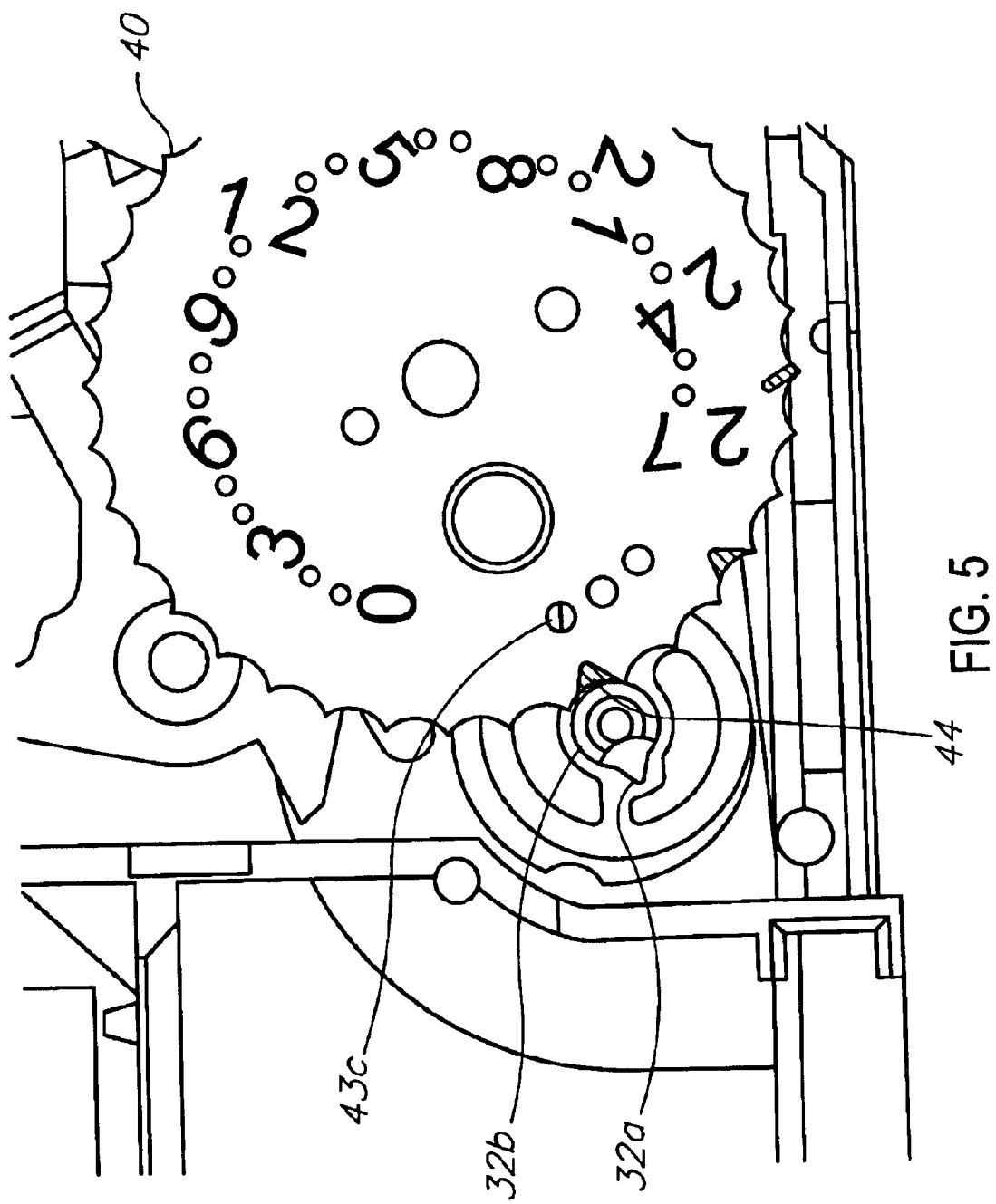
FIG. 5 is a top plan diagram of the sprocket cams relative to the counter wheel in accordance with one particular embodiment of the present invention.
Figure 6:
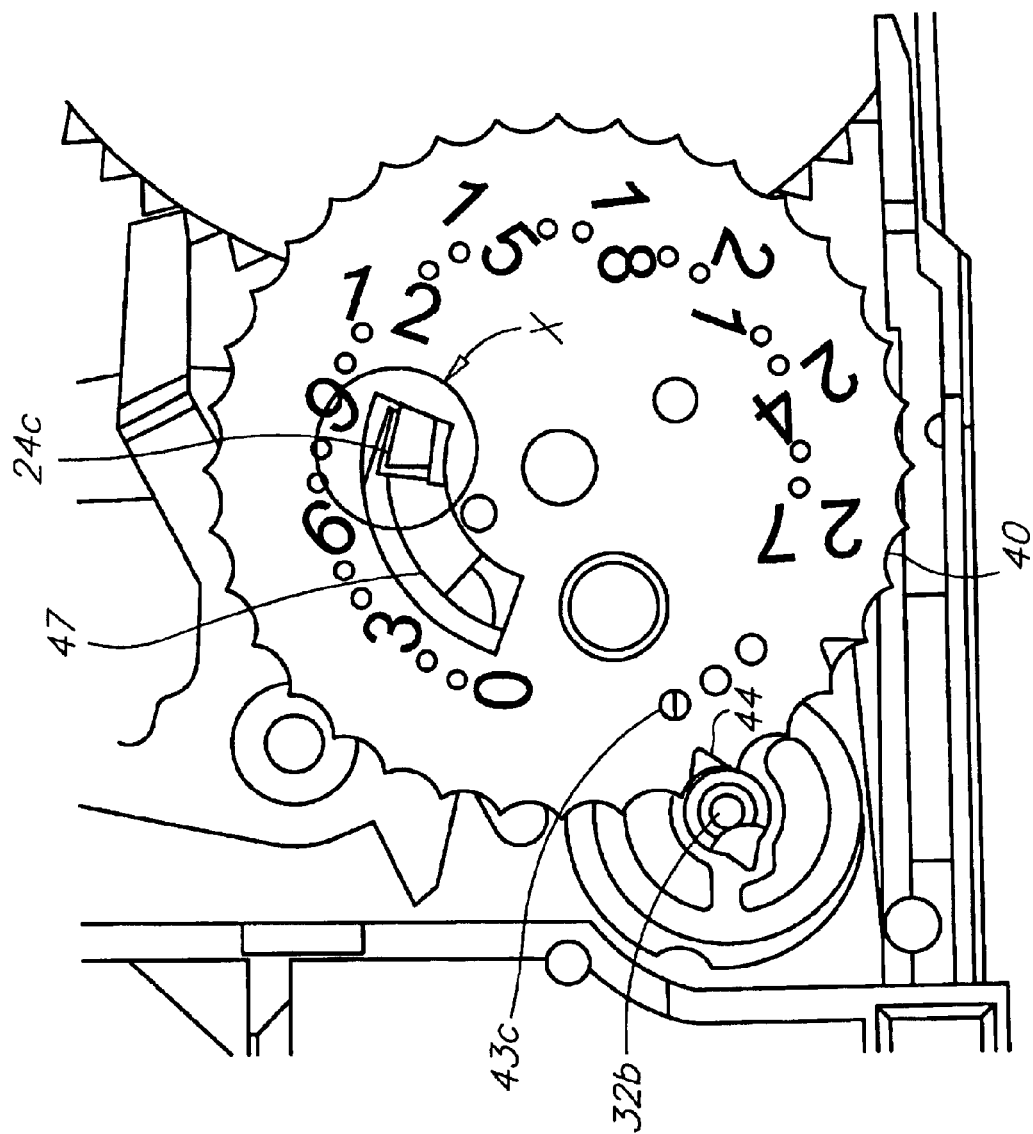
FIG. 6 is a top plan cutaway diagram of the counter wheel relative to the sprocket cams in accordance with one particular embodiment of the present invention.

After the sprocket shaft is locked, the counter wheel is centered on the shaft 22, such that the striker shaft is aligned with the alignment marks 43c and 44, as more particularly shown in FIG. 5. After roughly aligning the sprocket shaft with the first alignment indicia 44, to ensure that the counter wheel 40 is fully aligned, the counter wheel 40 may be pushed slightly clockwise until the wedge shaped protrusion 47 on the under side of the counter wheel 40 abuts the tab 24c of the release claw (24 of FIG. 3), as shown in area "x" of FIG. 6. Alternatively, the counter wheel 40 may include an indent and the release claw 24 may include a protuberance that mates with the indent when the counter wheel 40 is rotated. Preferably, the counter wheel 40 is turned using the finger of a person assembling the camera, although mechanical means may be used. Once the protrusion 47 engages the tab 24c, the counter wheel 40 will be locked into place by the release claw 24.

Figure 7:
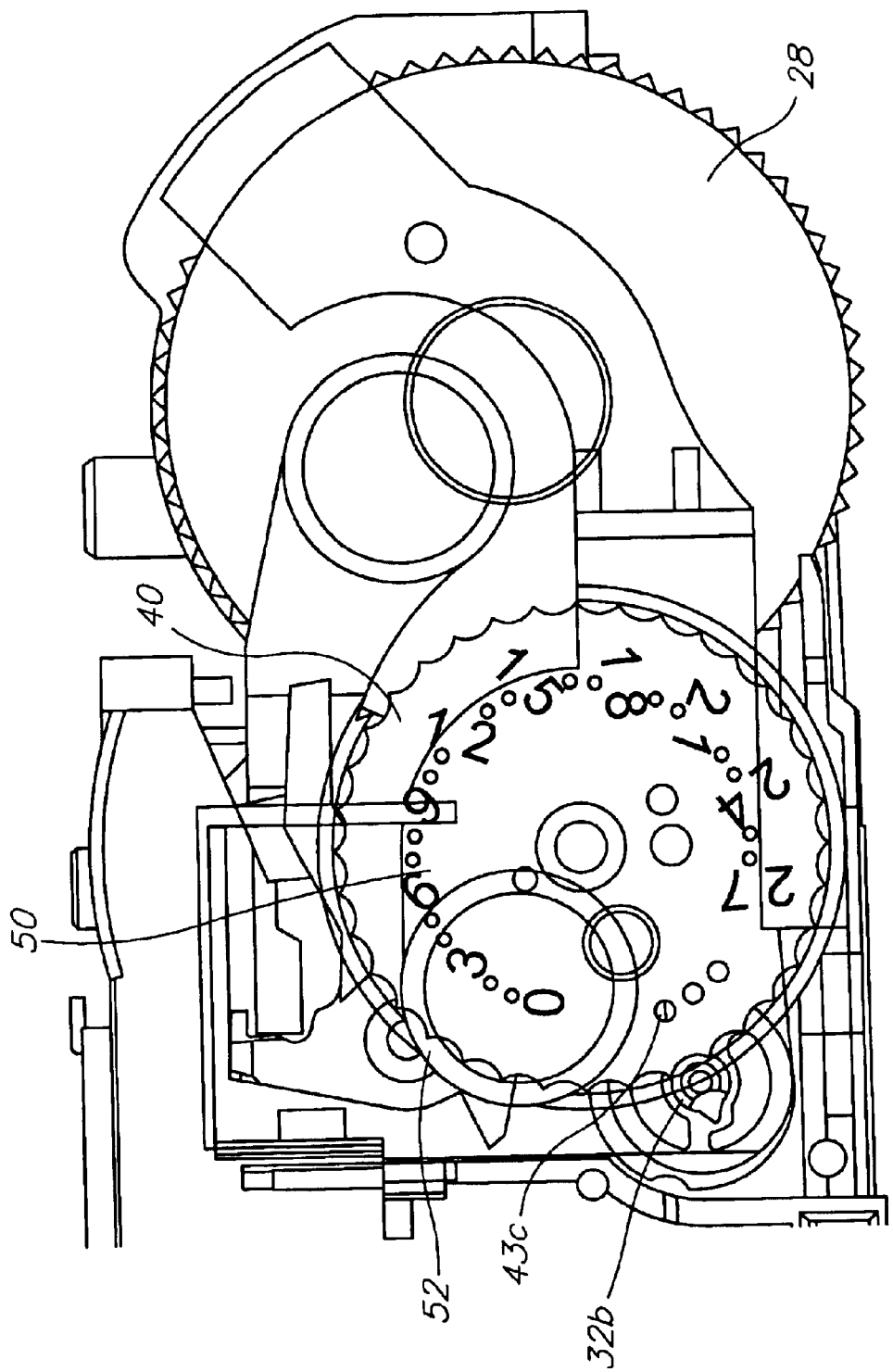
FIG. 7 is a top plan view of a portion of a camera in accordance with one embodiment of the present invention.
Figure 8:
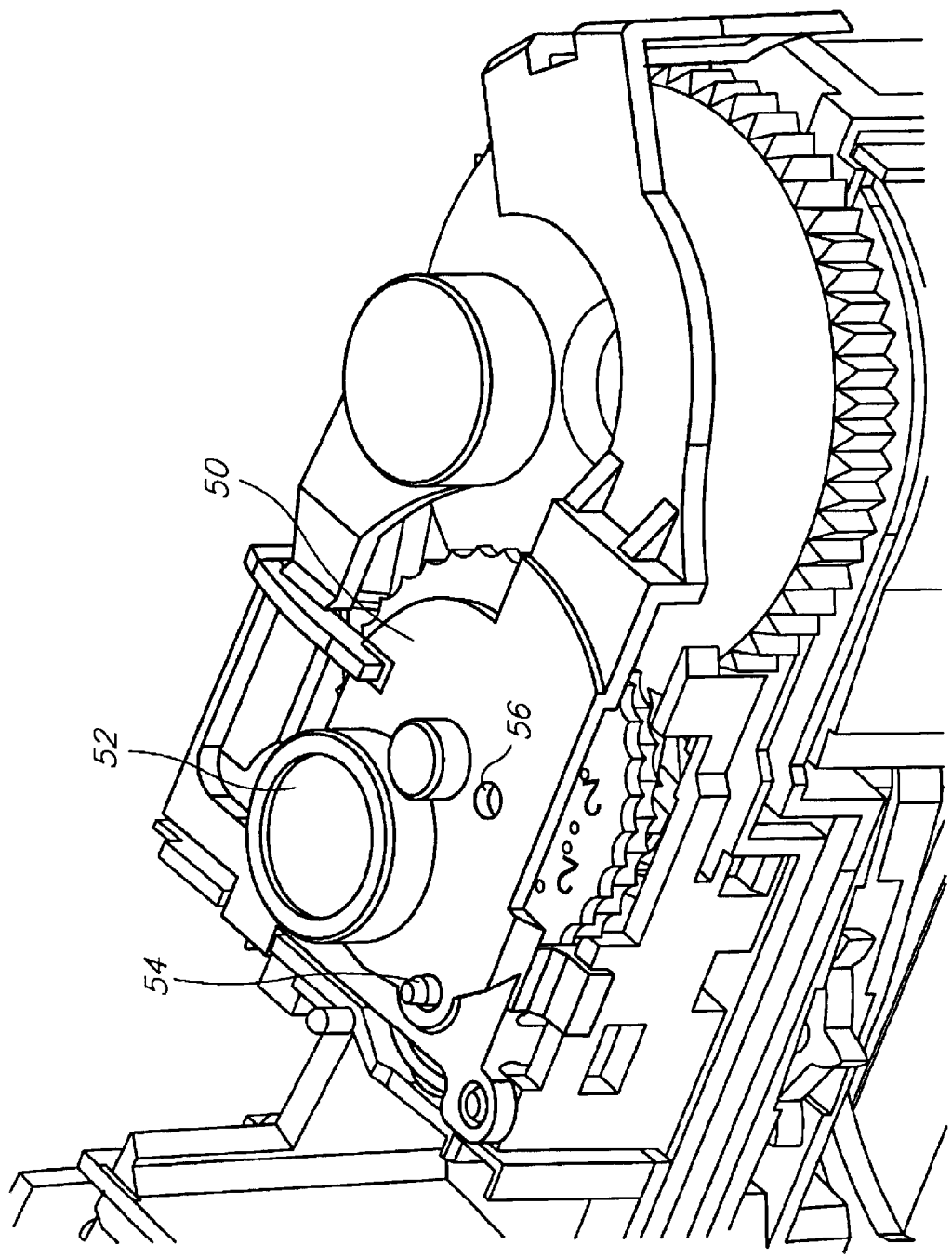
FIG. 8 is a perspective view of a portion of a camera in accordance with one embodiment of the present invention.

After locking the counter wheel 40 in place, the top plate 50 may be mated with the main body 12 of the camera 10 while still ensuring the alignment of the sprocket shaft pin 32b with the alignment hole 43c, as shown in FIG. 7. Additionally, sprocket shaft pin 32b will pass through the hole 54 of the top plate 50 as shown in FIGS. 7 and 8.

Figure 9:
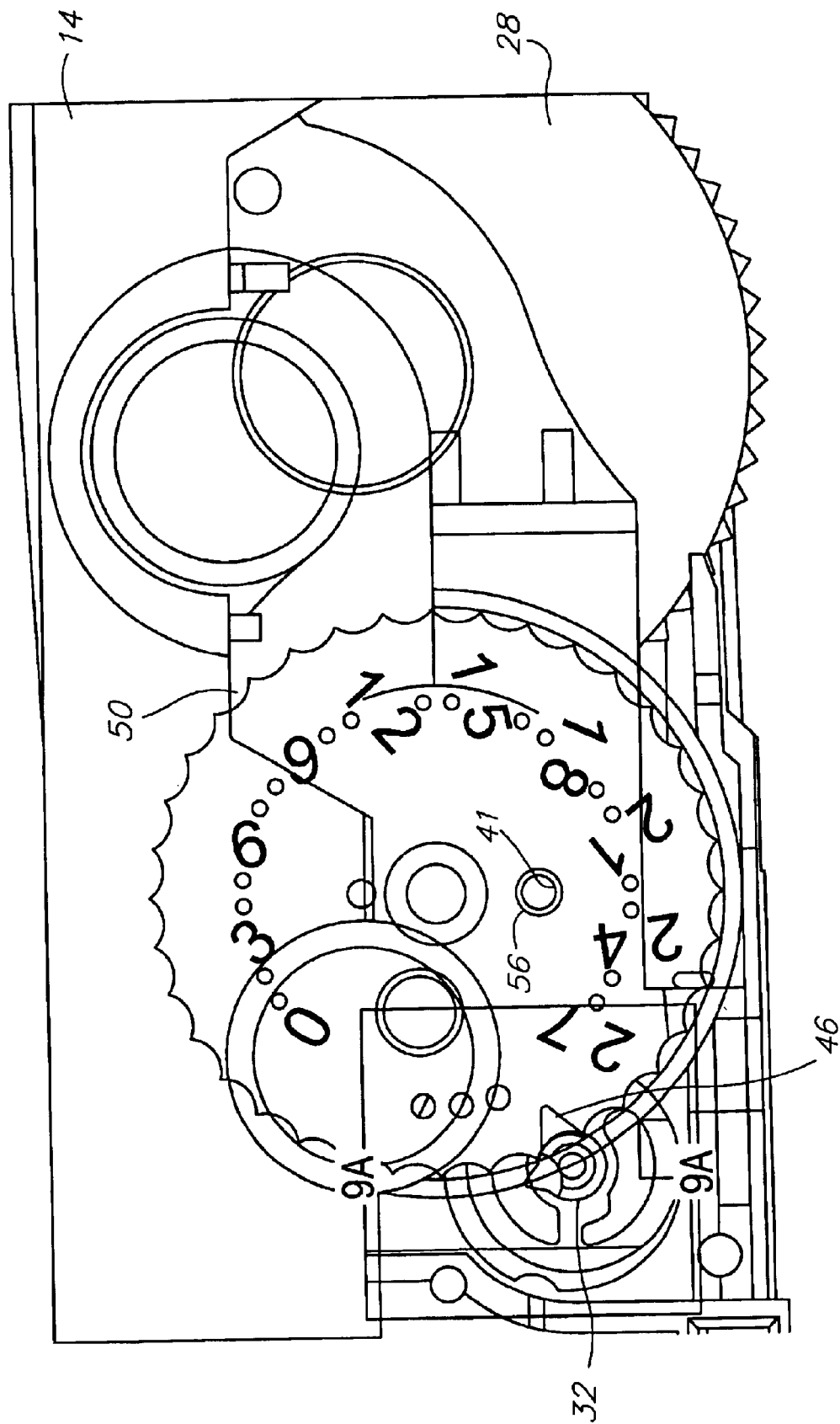
FIG. 9 is a top plan view of a portion of a camera in accordance with one embodiment of the present invention.
Figure 9B:
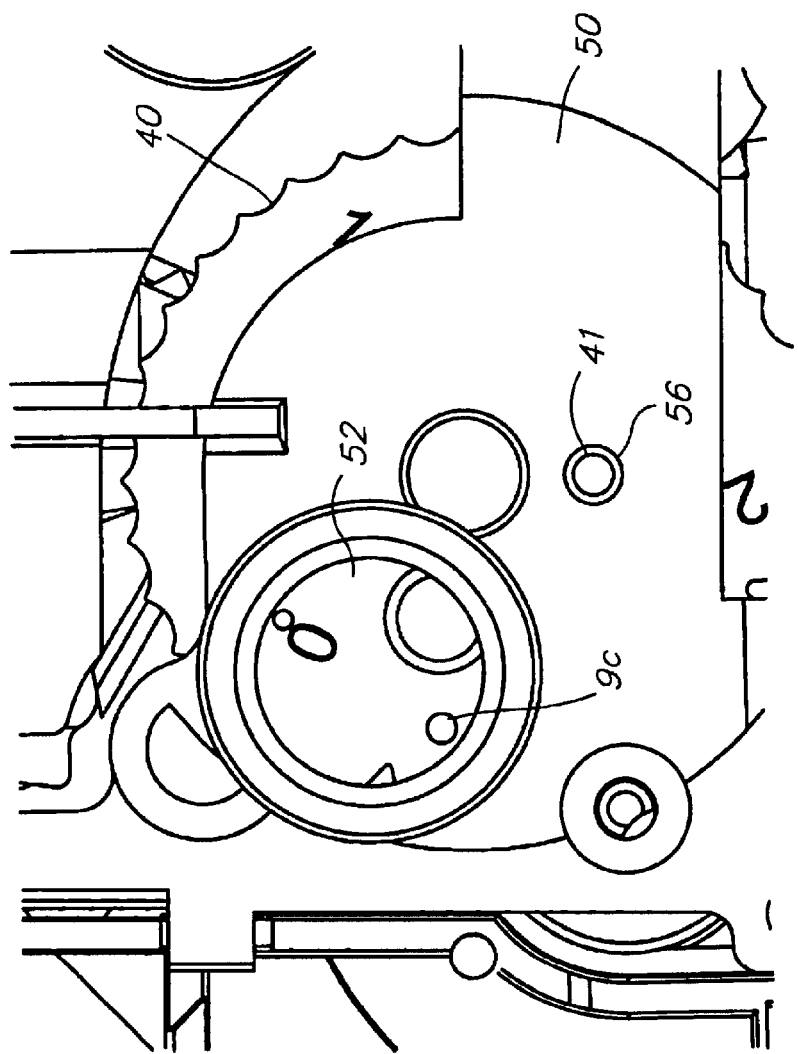
FIG. 9B is an enlarged view of a portion of FIG. 9.
Figure 9A:
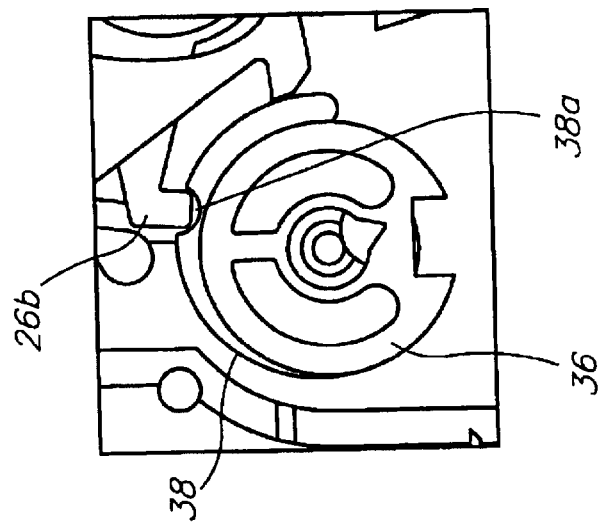
FIG. 9A is an enlarged view of a portion of FIG. 9 having the counter wheel removed.

After the top plate 50 has been locked to the main body 12, the front cover 14 may be placed on the main body 12 to ready the camera 10 for testing. Referring more specifically to FIGS. 9, 9A and 9B, with the front cover on, the sprocket assembly 30, and correspondingly the striker 26 and release claw 24 are moved to the film pre-load position. More specifically, the sprocket shaft is rotated, preferably by hand, until the follower finger 26b of the striker 26 rests in the "v" groove 38a of the secondary cam 38, as shown in FIG. 9A. The hole 56 in the top plate 50 should be aligned with the hole 41 in the counter wheel 40. Additionally, the sprocket shaft 32 may then align with the alignment indicia 46.

The film leader is pulled from the film cassette 16, passed over the sprocket 34 and attached to the spool 20. While the holes 56 and 41 still aligned and the shaft 32 aligned with the alignment indicia 46, the back cover of the camera is snapped on and the camera is readied for pre-winding. At this time, if desired, the alignment indicia 43c may be provided in the counter window 52 as a quality control check, as shown more particularly in FIG. 9B. The assembled camera is then loaded onto a pre-winding fixture and the anti-reversal pawl and metering system may be disengaged as described in the previously incorporated '457 patent or in my co-pending, commonly assigned patent application entitled DISENGAGEMENT MECHANISM FOR FILM PRE-LOADING AND FILM PRE-LOADING METHOD, based from provisional patent application No. 60/400,628 and filed on even date herewith, that application being incorporated herein by reference. During pre-winding, a rotatable tool (not shown) is engaged with the spool socket 22 and rotated to pre-wind the film onto the spool 20.

As the film is being pre-wound, the sprocket assembly is being rotated one revolution per film frame. Once each revolution, the tooth 32a on the sprocket shaft 32 engages a tooth 49 on the counter wheel and rotates the counter wheel by one frame count. After the film is completely pre-wound onto the spool 20, the counter window 52 will show the proper film count and, if desired, the alignment indicia 43a for quality control purposes. Alternately, if an additional frame is included to provide a test shot for quality control purposes, the counter window 52 will show no frame number, but after the test frame is shot, the proper counter number will appear in the counter window 52. At this time the camera 10 is ready for use by the consumer.

While the invention has been described with reference to certain embodiments, it will be understood by those skilled in the art that various changes may be made and equivalents may be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of setting a counter wheel in a camera, comprising:
    (a) providing a camera body, including,
        a film cassette chamber,
        a film roll chamber, and
        a sprocket assembly, at least a portion of which is mounted to said camera body between said film cassette chamber and said film roll chamber, said sprocket assembly including a sprocket wheel and a locking member, wherein said locking member periodically locks to prevent rotation of said sprocket wheel, said locking member including a mating portion;
    (b) locking said sprocket wheel with said locking member;
    (c) providing a counter wheel including counting indicia and a complementary portion for mating with said mating portion;
    (d) placing said counter wheel in rotational engagement with said camera body;
    (e) after step (b), rotating said counter wheel in a first direction until said complementary portion locks with said mating portion to prevent further rotation of said counter wheel in said first direction;
    (f) placing a plate over said counter wheel to lock said counter wheel to said camera body;
    (g) loading a web of film across a portion of said film sprocket, from said film cassette chamber to said film roll chamber;
    (h) providing a front camera cover and a rear camera cover; and
    (i) matingly engaging said front camera cover and said rear camera cover to form a camera housing including said camera body, said plate and said web of film located therein.

2. The method of claim 1, wherein said counter wheel additionally includes a plurality of teeth spaced around the periphery thereof, and wherein said sprocket assembly includes a single tooth thereon, said single tooth being engaged with said counter wheel such that one full rotation of said film sprocket results in the rotation of said counter wheel in a second direction by one of said plurality of teeth.

3. The method of claim 2, additionally including the step of pre-winding said web of film into a roll in said film roll chamber, wherein said counter is set to its starting position by said pre-winding step.

4. The method of claim 3, wherein said counting indicia is located on the top surface of said counter wheel and said complementary portion includes a protrusion having at least one straight edge.

5. The method of claim 4, wherein said mating portion includes a shoulder including at least one straight edge to abut said straight edge of said complementary portion.

6. The method of claim 5, wherein said counter wheel additionally includes alignment indicia visible on said top surface.

7. The method of claim 6, wherein said alignment indicia includes a first hole.

8. The method of claim 6, wherein said alignment indicia includes a visual indicator silk-screened onto said counter wheel.

9. The method of claim 6, wherein said placing said counter wheel step further includes aligning said sprocket assembly with said alignment indicia.

10. The method of claim 7, wherein said plate includes a second hole which is aligned with said first hole after said placing step.

11. The method of claim 3, wherein said sprocket assembly additionally includes a sprocket shaft, a first cam and a second cam, wherein each of said film sprocket, said first cam and said second cam is mounted concentrically around said shaft.

12. The method of claim 11, wherein said first cam includes an indentation and said locking member includes a follower finger, wherein said follower finger engages said indentation to lock said film sprocket in said locking step.

13. The method of claim 12, wherein said second cam is a ramped cam having an outer diameter eccentrically located from said shaft, said cam including a groove in said ramp portion, said locking member additionally including a cam follower finger, such that said cam follower finger engages said groove to discourage said film sprocket from moving, after said placing the counter wheel step and prior to said loading step.

14. The method of claim 13, wherein said locking member includes a release claw and a striker, wherein said release claw includes said follower finger and said striker includes said cam follower finger.

15. A camera, comprising:
    a camera body, including,
        a film cassette chamber,
        a film roll chamber, and
        a sprocket assembly, at least a portion of which is mounted to said camera body between said film cassette chamber and said film roll chamber, said sprocket assembly including a sprocket wheel and a locking member, wherein said locking member periodically locks to prevent rotation of said sprocket wheel, said locking member including a mating portion;
    a counter wheel including counting indicia and a complementary portion for initially mating with said mating portion at a time when said locking member is locked;
    a plate located over said counter wheel to lock said counter wheel to said camera body;
    a web of film loaded across a portion of said film sprocket, from said film cassette chamber to said film roll chamber; and
    a front camera cover and a rear camera cover engaged to form a camera housing including said camera body, said plate and said web of film located therein; and
    wherein said counter wheel additionally includes a plurality of teeth spaced around the periphery thereof, and wherein said sprocket assembly includes a single tooth thereon, said single tooth being engaged with said counter wheel such that one full rotation of said film sprocket results in the rotation of said counter wheel in a second direction by one of said plurality of teeth.

16. The camera of claim 15, wherein said counting indicia is located on the top surface of said counter wheel and said complementary portion is located on the bottom surface of said counter wheel, wherein said complementary portion is a wedge shaped protrusion and said mating portion is a shoulder shaped to abut a portion of said wedge.

17. The camera of claim 16, wherein said counter wheel additionally includes alignment indicia visible on said top surface to assist visually in aligning said mating portion with said complementary portion when initially assembled.

18. The camera of claim 17, wherein said wedge is located opposite from said counter wheel from said alignment indicia and on a different surface.

19. The method of claim 18, wherein said sprocket assembly additionally includes a sprocket shaft, a first cam and a second cam, wherein each of said film sprocket, said first cam and said second cam is mounted concentrically around said shaft, said first cam including an indentation and said locking member includes a follower finger, wherein said follower finger engages said indentation to initially lock said film sprocket.

20. The method of claim 19, wherein said second cam is a ramped cam having an outer diameter eccentrically located on said shaft, said cam including a groove in said ramp portion, said locking member additionally including a cam follower finger, such that said cam follower finger engages said groove to discourage said film sprocket from moving, after said follower finger is released from said first cam and prior to film pre-winding.

* * * * *